US010809597B2

(12) United States Patent
Tominaga et al.

(10) Patent No.: US 10,809,597 B2
(45) Date of Patent: Oct. 20, 2020

(54) IMAGING DEVICE

(71) Applicant: Panasonic Intellectual Property Management Co., Ltd., Osaka (JP)

(72) Inventors: Yuji Tominaga, Osaka (JP); Takuo Taniguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/457,988

(22) Filed: Jun. 29, 2019

(65) Prior Publication Data
US 2020/0117072 A1 Apr. 16, 2020

(30) Foreign Application Priority Data

Oct. 11, 2018 (JP) .................. 2018-192449
Apr. 8, 2019 (JP) .................. 2019-073370

(51) Int. Cl.
| | |
|---|---|
| *G02B 17/04* | (2006.01) |
| *H04N 5/232* | (2006.01) |
| *G03B 13/02* | (2006.01) |
| *G03B 17/02* | (2006.01) |
| *G03B 17/04* | (2006.01) |
| *G03B 17/12* | (2006.01) |

(52) U.S. Cl.
CPC ............ *G03B 17/04* (2013.01); *G03B 13/02* (2013.01); *G03B 17/12* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 8,042,231 B2* | 10/2011 | Bae | ...................... | G06F 1/1622 |
| | | | | 16/367 |
| 2004/0100576 A1* | 5/2004 | Lu | ...................... | H04N 5/23293 |
| | | | | 348/375 |
| 2007/0229694 A1* | 10/2007 | Oshima | ................ | H04N 5/2251 |
| | | | | 348/333.06 |
| 2011/0157798 A1* | 6/2011 | Kawai | .................. | H04N 5/2251 |
| | | | | 361/679.01 |

(Continued)

FOREIGN PATENT DOCUMENTS

JP 2003-315891 A 11/2003

*Primary Examiner* — William B Perkey
(74) *Attorney, Agent, or Firm* — Renner, Otto, Boisselle & Sklar, LLP

(57) ABSTRACT

The imaging device includes a support member attached to the device main body and a display panel attached to the support member. The support member is configured to pivot around a first rotation axis and thereby move to a storage position and a tilt position. The display panel is configured to pivot around a second rotation axis orthogonal to the first rotation axis and thereby move to a closed position and an opened position and to pivot around a third rotation axis orthogonal to the second rotation axis and thereby vary a tilt angle of a display surface with respect to the extending direction of the second hinge part. When the support member is located at the tilt position and the display panel located at the opened position is pivoted around the third rotation axis, the display panel passes through outside the connector connection region.

11 Claims, 8 Drawing Sheets

(56) References Cited

U.S. PATENT DOCUMENTS

| | | | | |
|---|---|---|---|---|
| 2013/0038769 A1* | 2/2013 | Xiaoping | ............... | G03B 17/56 |
| | | | | 348/333.01 |
| 2016/0057358 A1* | 2/2016 | Yamamoto | ......... | H04N 5/23293 |
| | | | | 348/333.06 |
| 2016/0191762 A1* | 6/2016 | Taniguchi | ............... | G03B 17/04 |
| | | | | 348/262 |
| 2017/0078535 A1* | 3/2017 | Akiyama | ............. | H04N 5/2251 |
| 2018/0213157 A1* | 7/2018 | Suzuki | ............. | H04N 5/225251 |
| 2020/0117072 A1* | 4/2020 | Tominaga | ............... | G03B 17/04 |

* cited by examiner

IMAGING DEVICE

BACKGROUND

Technical Field

The present disclosure relates to an imaging device with a display surface of a display panel adjustable to various angles.

Related Art

A conventionally known imaging device of this type is disclosed in JP 2003-315891 A, for example. JP 2003-315891 A discloses a technique for avoiding limitation of movement of a display panel due to interference with an external connector connected to a terminal part of a device main body. More specifically, Japanese Laid-Open Patent Publication No. 2003-315891 discloses the imaging device configured such that the terminal part is disposed at a position not overlapping with the movable range of the display panel and that an attaching/detaching direction of an external connector has an upward angle with respect to a horizontal plane.

However, it is required to attach various components, such as various buttons including a power button and a shutter button, a mode dial, and a hot shoe, to the device main body of the imaging device. Moreover, multiple connectors such as an HDMI (registered trademark) connector, a USB (Universal Serial Bus) connector, and a headphone connector are connected as external connectors connected to the terminal part, and a large size must be ensured for the terminal part itself. Therefore, if it is attempted to dispose the terminal part at a position not overlapping with the movable range of the display panel as in the imaging device of Japanese Laid-Open Patent Publication No. 2003-315891, the device increases in size.

Additionally, an increasing number of users recently connect multiple external connectors such as an HDMI connector and a headphone connector to the terminal part to take a moving image by an imaging device while displaying the image on an external monitor connected through the HDMI connector. Recently increasingly-widespread imaging devices are configured to have a built-in battery used as a power source and charged through a USB connector. Therefore, a USB connector may be connected as an external connector to the terminal part, and the imaging device may be used while a built-in battery is assisted through the USB connector in some cases. Thus, the need is growing for an imaging device capable of improving a degree of freedom of movement of a display panel even with an external connector connected to a terminal part.

SUMMARY

An object of the present disclosure is to solve the issues and to provide an imaging device capable of suppressing an increase in size of the device and improving a degree of freedom of movement of a display panel.

An imaging device according to the present disclosure is an imaging device including:

a device main body including a terminal part to which an external connector is connected;

a support member attached to the device main body via a first hinge part;

a display panel attached to the support member via a second hinge part and including a display surface; wherein the support member is configured to pivot (rotate) around a first rotation axis extending in an extending direction of the first hinge part and thereby move to a storage position and a tilt position, wherein the display panel is configured to pivot around a second rotation axis extending in an extending direction of the second hinge part and orthogonal to the first rotation axis and thereby move to a closed position and an opened position and to pivot around a third rotation axis orthogonal to the second rotation axis and thereby vary a tilt angle of the display surface with respect to the extending direction of the second hinge part, wherein when the support member is located at the storage position and the display panel located at the opened position is pivoted around the third rotation axis, the display panel passes through inside a connector connection region facing the terminal part, and wherein when the support member is located at the tilt position and the display panel located at the opened position is pivoted around the third rotation axis, the display panel passes through outside the connector connection region.

The imaging device of the present disclosure can suppress an increase in size of the device and improve a degree of freedom of movement of a display panel.

DESCRIPTION OF THE EMBODIMENTS

Figure 1:
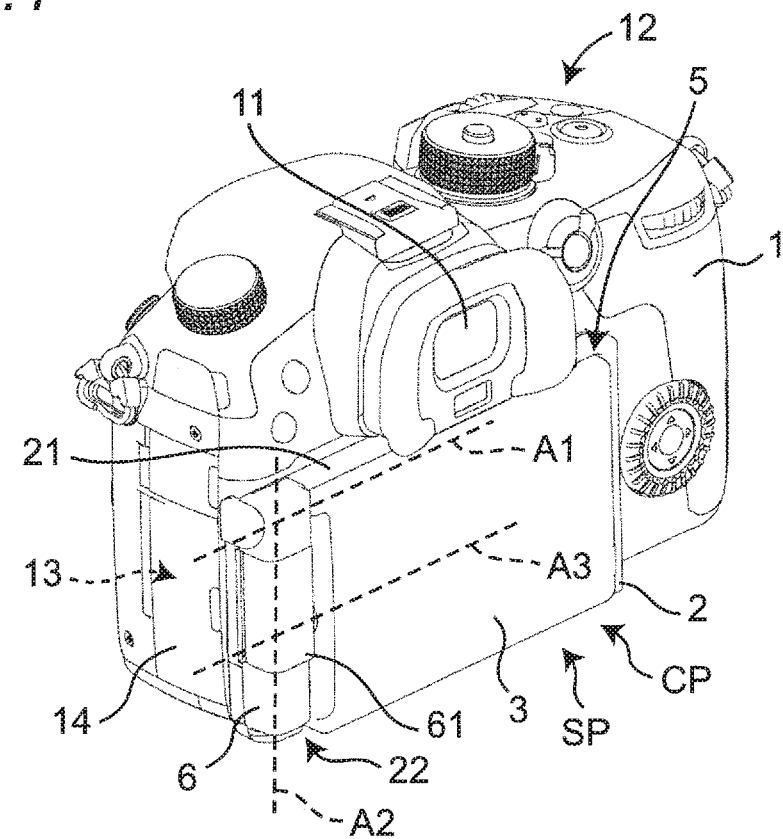
FIG. 1 is a perspective view of an imaging device according to a first embodiment as viewed from the back side, showing a state with a support member located at a storage position and a display panel located at a closed position.

According to a first aspect of the present disclosure, there is provided an imaging device including:

a device main body including a terminal part to which an external connector is connected;

a support member attached to the device main body via a first hinge part;

a display panel attached to the support member via a second hinge part and including a display surface; wherein the support member is configured to pivot around a first rotation axis extending in an extending direction of the first hinge part and thereby move to a storage position and a tilt position, wherein the display panel is configured to pivot around a second rotation axis extending in an extending direction of the second hinge part and orthogonal to the first rotation axis and thereby move to a closed position and an opened position and to pivot around a third rotation axis orthogonal to the second rotation axis and thereby vary a tilt angle of the display surface with respect to the extending direction of the second hinge part, wherein when the support member is located at the storage position and the display panel located at the opened position is pivoted around the third rotation axis, the display panel passes through inside a connector connection region facing the terminal part, and wherein when the support member is located at the tilt position and the display panel located at the opened position is pivoted around the third rotation axis, the display panel passes through outside the connector connection region.

According to a second aspect of the present disclosure, there is provided the imaging device according to the first aspect, wherein when the support member is located at the tilt position and the display panel located at the opened position is pivoted around the third rotation axis, the support member is held to maintain the state of being located at the tilt position.

According to a third aspect of the present disclosure, there is provided the imaging device according to the first or second aspect, wherein the support member is configured to pivot within a range of an angle less than 90 degrees around the first rotation axis.

According to a fourth aspect of the present disclosure, there is provided the imaging device according to any one of the first to third aspects, further comprising, at least at one holding position between the storage position and the tilt position, a holding mechanism holding the support member at the holding position with a holding force stronger than a rotation force rotating the support member from the storage position to the holding position.

According to a fifth aspect of the present disclosure, there is provided the imaging device according to the forth aspect, wherein the holding force of the holding mechanism is larger than a rotation force required for rotating the display panel around the third rotation axis.

According to a sixth aspect of the present disclosure, there is provided the imaging device according to the fourth or fifth aspect, wherein the device main body includes a finder, wherein when the support member is located at the holding position and the display panel is rotated around the second rotation axis from the closed position toward the opened position, the display panel does not come into contact with the finder, and wherein when the support member is located at the tilt position and the display panel is rotated around the second rotation axis from the closed position toward the opened position, the display panel comes into contact with the finder.

According to a seventh aspect of the present disclosure, there is provided the imaging device according to any one of the fourth to sixth aspects, wherein the holding mechanism is configured to include a convex part and a concave part such that the convex part engages with the concave part to hold the support member at the holding position and that the holding of the support member at the holding position is released when the convex part comes out of the concave part.

According to an eighth aspect of the present disclosure, there is provided the imaging device according to any one of the fourth to seventh aspects, wherein the display panel is configured to pass through outside the connector connection region when the support member is located at the holding position and the display panel located at the opened position is pivoted around the third rotation axis.

According to a ninth aspect of the present disclosure, there is provided an imaging device including:

a device main body including a finder;

a support member attached to the device main body via a first hinge part;

a display panel attached to the support member via a second hinge part and including a display surface; wherein the support member is configured to pivot around a first rotation axis extending in an extending direction of the first hinge part and thereby move from a storage position through at least one holding position to a tilt position, wherein the display panel is configured to pivot around a second rotation axis extending in an extending direction of the second hinge part and orthogonal to the first rotation axis and thereby move to a closed position and an opened position, and wherein the imaging device further includes a holding mechanism holding the support member at the holding position with a holding force stronger than a rotation force rotating the support member from the storage position to the holding position.

According to a tenth aspect of the present disclosure, there is provided the imaging device according to the ninth aspect, wherein when the support member is located at the holding position and the display panel is rotated around the second rotation axis from the closed position toward the opened position, the display panel does not come into contact with the finder, and wherein when the support member is located at the tilt position and the display panel is rotated around the second rotation axis from the closed position toward the opened position, the display panel comes into contact with the finder.

According to an eleventh aspect of the present disclosure, there is provided the imaging device according to the ninth or tenth aspect, wherein the holding mechanism is configured to include a convex part and a concave part such that the convex part engages with the concave part to hold the support member at the holding position and that the holding of the support member at the holding position is released when the convex part comes out of the concave part.

An embodiment will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in claims thereto.

In the following description, for convenience of description, terms indicative of directions such as "upper", "lower", "front surface", and "back surface" are used on the assumption of a normal usage state; however, this does not mean the limitation of the usage state etc. of the imaging device of the present disclosure.

First Embodiment

FIG. 1 is a perspective view of an imaging device according to a first embodiment as viewed from the back side. In the first embodiment, the imaging device is a lens-interchangeable digital camera.

As shown in FIG. 1, the imaging device according to the first embodiment includes a device main body 1, a support member 2, and a display panel 3.

The device main body 1 is a device taking a still image or a moving image. The device main body 1 has a photographing mechanism (not shown) built-in for taking a still image or a moving image. A front surface of the device main body 1 is provided with a mount (not shown) to which various types of lenses can be attached. The photographing mechanism takes an image through a lens.

A finder 11 is disposed in an upper portion of a back surface of the device main body 1. Various components 12 such as various buttons including a power button and a shutter button, a mode dial, and a hot shoe are attached to an upper surface of the device main body 1. One side surface of the device main body 1 is provided with a terminal part 13 to which an external connector is connected. The terminal part 13 is covered by a lid 14.

Figure 2:
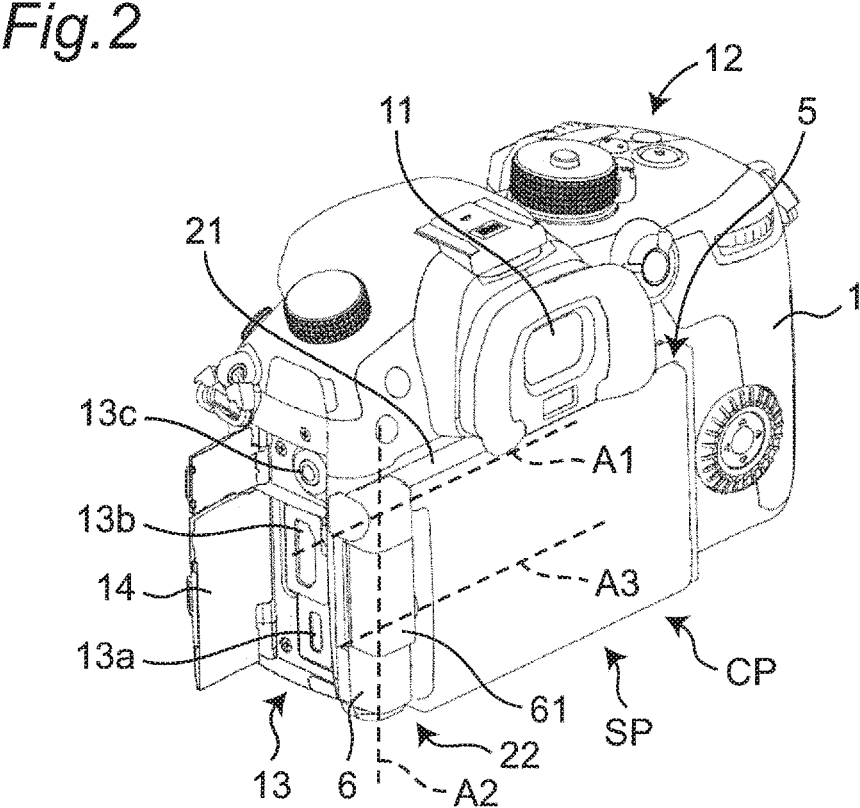
FIG. 2 is a perspective view showing a state of the imaging device of FIG. 1 in which a lid covering a terminal part of a device main body is opened, showing a state with the support member located at the storage position and the display panel located at the closed position.
Figure 3:
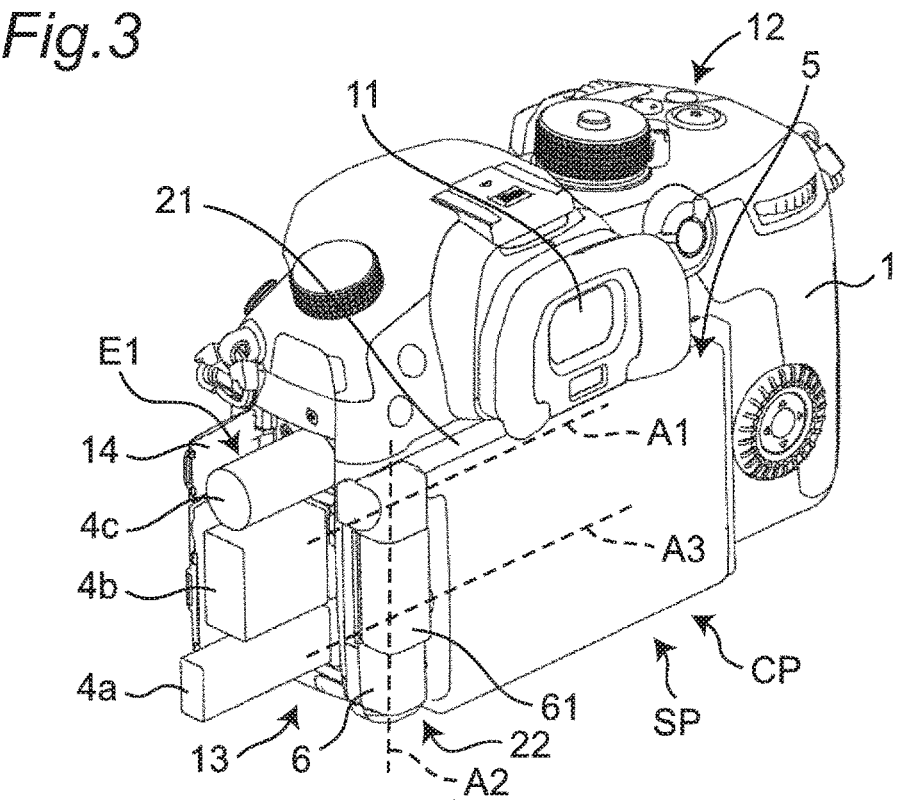
FIG. 3 is a perspective view showing a state of the imaging device of FIG. 1 in which external connectors are connected to the terminal part of the device main body, showing a state with the support member located at the storage position and the display panel located at the closed position.

FIG. 2 shows a state of the imaging device of FIG. 1 with the lid 14 opened. FIG. 3 shows a state of the imaging device of FIG. 1 with external connectors connected to the terminal part 13.

As shown in FIG. 2, in the first embodiment, the terminal part 13 includes a USB terminal 13a, an HDMI terminal 13b, and a headphone terminal 13c.

As shown in FIG. 3, a USB connector 4a is detachably connected as an external connector to the USB terminal 13a. By connecting the USB connector 4a to the USB terminal 13a and supplying electric power through the USB connector 4a, a battery (not shown) built in the imaging device 1 can be charged.

An HDMI connector 4b is detachably connected as an external connector to the HDMI terminal 13b. By connecting the HDMI connector 4b to the HDMI terminal 13b, video/audio signals can be output through the HDMI connector 4b to an electronic device etc.

A headphone connector 4c is detachably connected as an external connector to the headphone terminal 13c. By connecting the headphone connector 4c to the headphone terminal 13c, an audio signal can be output through the headphone connector 4c to a headphone.

In FIG. 3, portions of the external connectors are shown without showing the other portions. Also, in FIGS. 4 to 10 described below, the other portions of the external connectors are not shown.

The support member 2 is attached to the device main body 1 via a first hinge part 5. In the first embodiment, the first hinge part 5 is disposed to extend in a left-right direction below the finder 11. The support member 2 supports the display panel 3. The support member 2 is formed into a substantially rectangular plate shape. The support member 2 has an upper side part 21 attached to the device main body 1 via the first hinge part 5 pivotally (rotatably) around a first rotation axis A1 extending in the extending direction of the first hinge part 5.

The display panel 3 is attached to the support member 2 via a second hinge part 6. In the first embodiment, the second hinge part 6 is disposed to extend along a lateral side part 22 of the support member 2 located near the terminal part 13. The display panel 3 is formed into a substantially rectangular plate shape. The display panel 3 is attached to the support member 2 via the second hinge part 6 pivotally around a second rotation axis A2 extending in the extending direction of the second hinge part 6 and orthogonal to the first rotation axis A1. The display panel 3 is attached to an intermediate part 61 in the extending direction of the second hinge part 6 pivotally around a third rotation axis A3 orthogonal to the second rotation axis A2.

Figure 4:
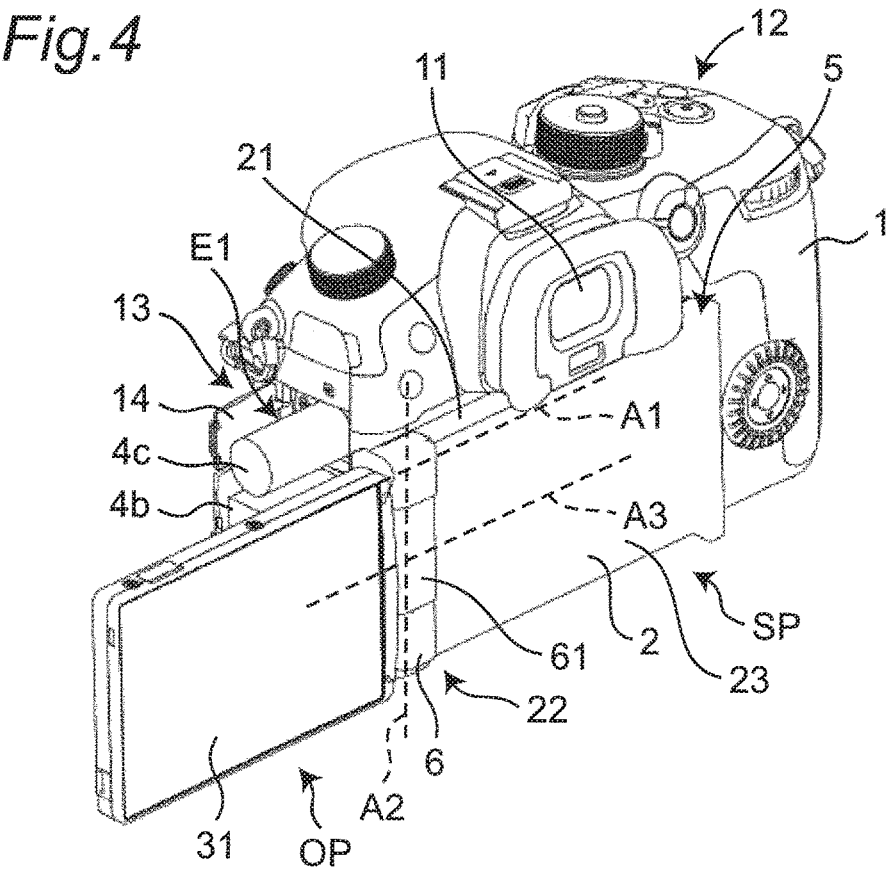
FIG. 4 is a perspective view showing a state of the imaging device of FIG. 3 with the support member located at the storage position and the display panel located at an opened position.
Figure 5:
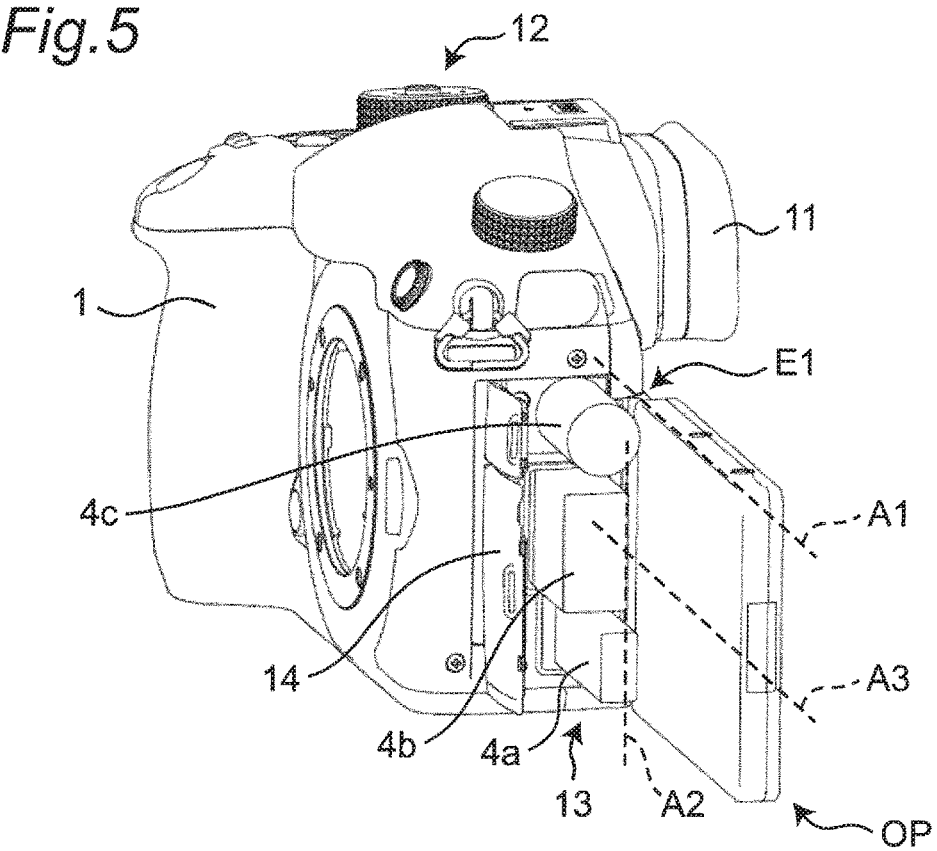
FIG. 5 is a perspective view of the state shown in FIG. 4 as viewed from another angle.

FIGS. 4 and 5 are perspective views showing a state in which the display panel 3 is pivoted around the second rotation axis A2 from the state shown in FIG. 3.

The display panel 3 is configured to pivot around the second rotation axis A2 and thereby move to a closed position CP (see FIGS. 1 to 3) along a back surface 23 of the support member 2 and an opened position OP (see FIGS. 4 and 5) on a lateral side of the back surface 23 of the support member 2. In the first embodiment, the display panel 3 is configured to pivot around the second rotation axis A2 by 180 degrees and thereby move to the closed position CP and the opened position OP.

As shown in FIG. 4, the display panel 3 has a display surface 31 on one principal surface. The display surface 31 displays a still image or a moving image taken by the device main body 1. The display surface 31 is a liquid crystal monitor, for example.

Figure 6:
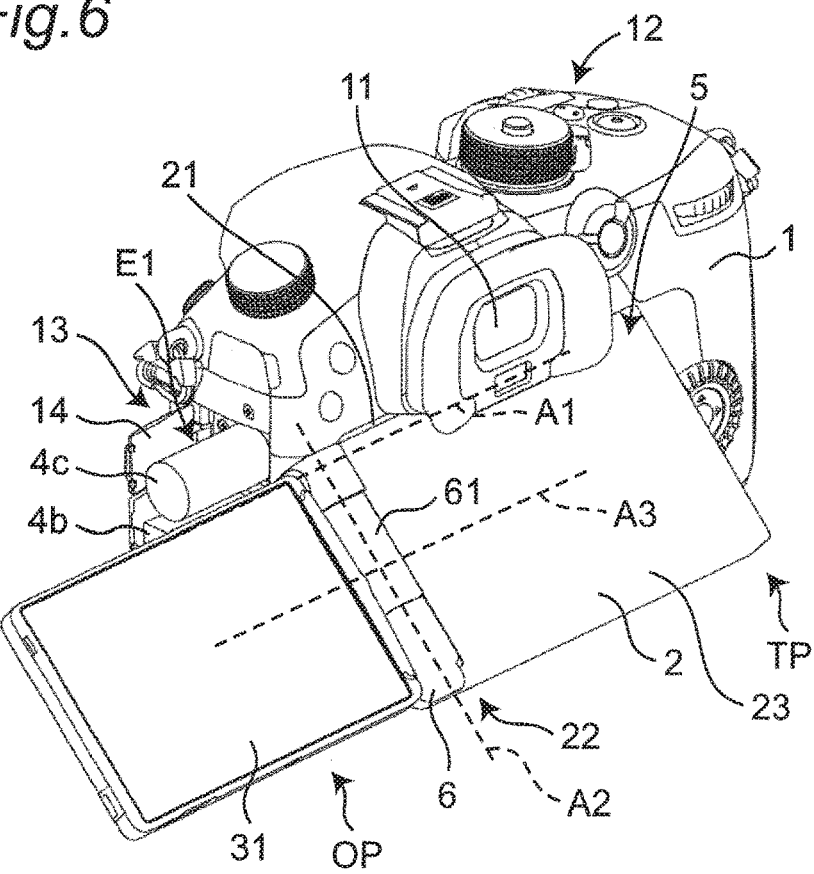
FIG. 6 is a perspective view showing a state of the imaging device of FIG. 3 with the support member located at a tilt position and the display panel located at the opened position.

FIG. 6 is a perspective view showing a state in which the support member 2 is pivoted around the first rotation axis A1 from the state shown in FIGS. 4 and 5.

The support member 2 is configured to pivot around the first rotation axis A1 and thereby move to a storage position SP (see FIGS. 1 to 3) along the back surface of the device main body 1 and a tilt position TP (see FIG. 6) tilted with respect to the back surface of the device main body 1. In the first embodiment, the support member 2 is configured to pivot within a range of an angle less than 90 degrees (e.g., 45 degrees) around the first rotation axis A1 and thereby move to the storage position SP and the tilt position TP.

Figure 7:
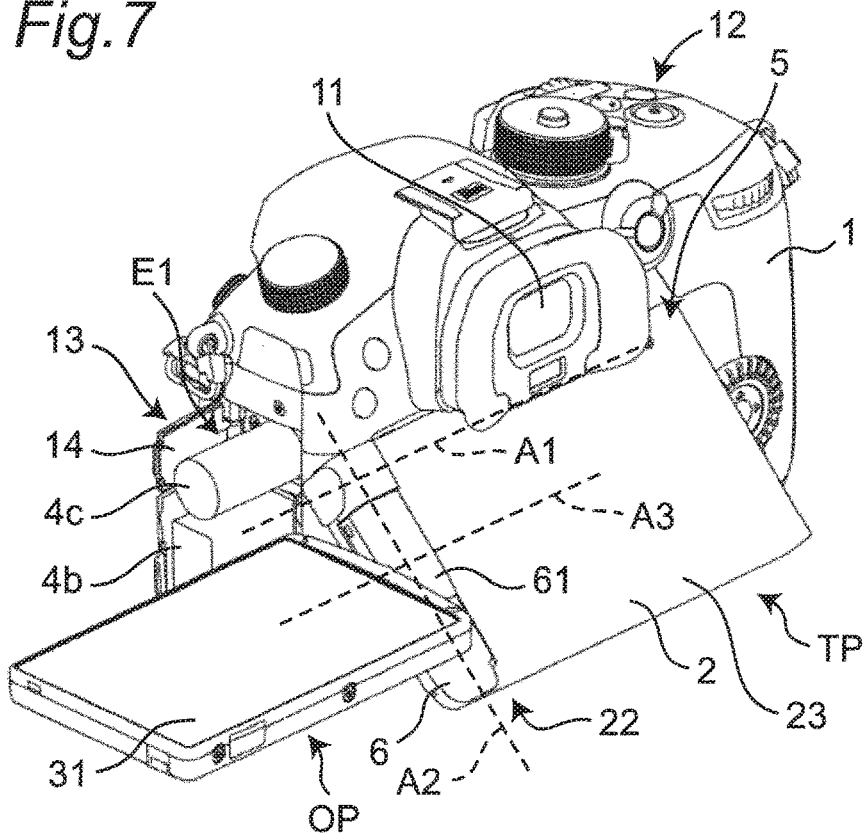
FIG. 7 is a perspective view showing a state in which a display surface of the display panel is further rotated from the state shown in FIG. 6.
Figure 8:
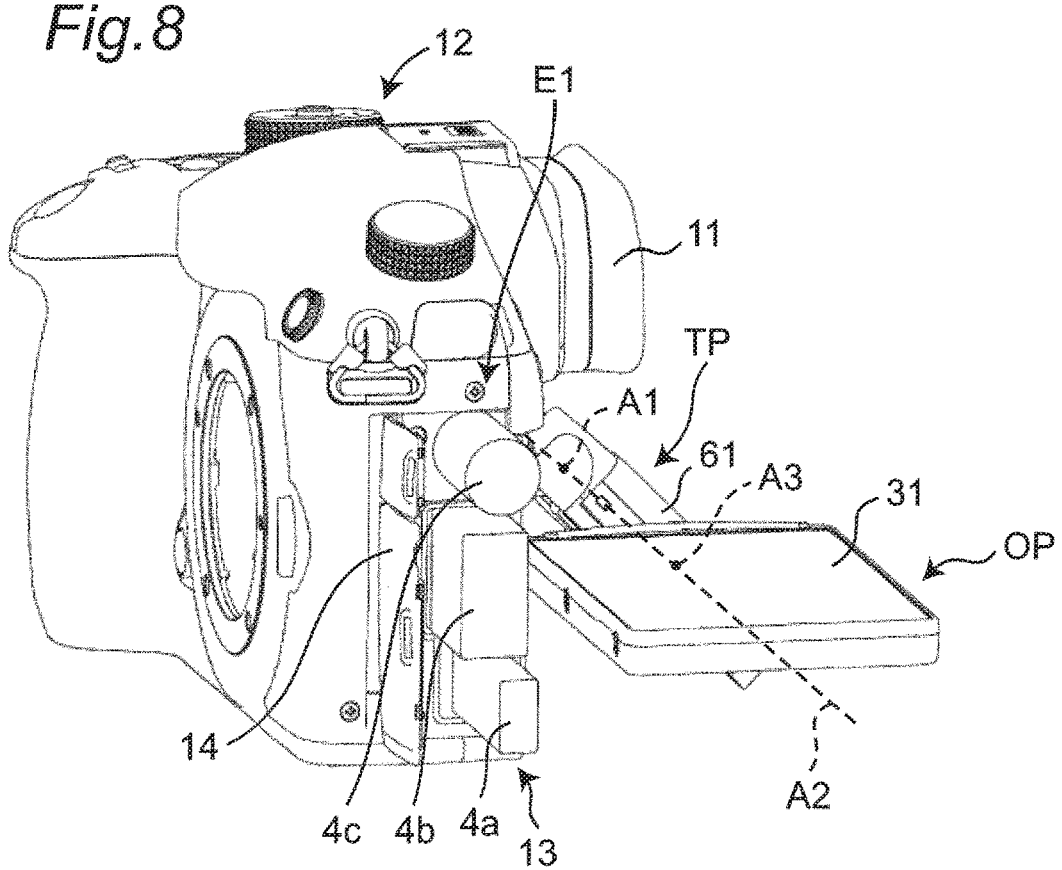
FIG. 8 is a perspective view of the state shown in FIG. 7 as viewed from another angle.
Figure 9:
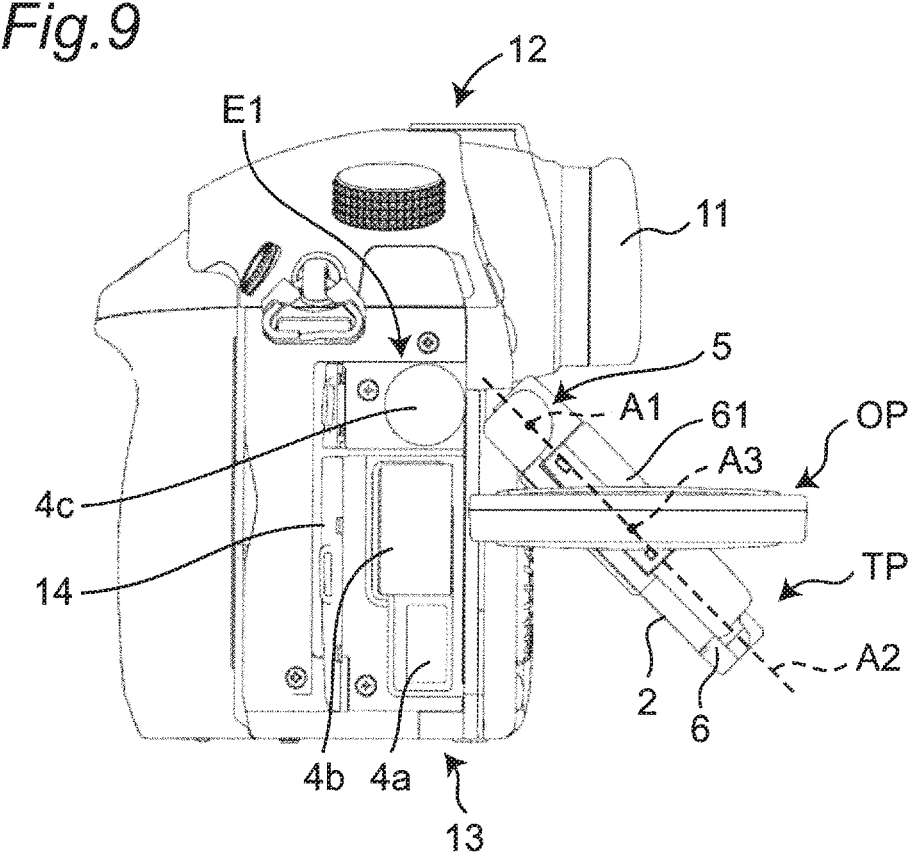
FIG. 9 is a side view of the state shown in FIG. 7 as viewed in a lateral direction.

FIGS. 7 and 8 are perspective views showing a state in which the display panel 3 is pivoted around the third rotation axis A3 from the states shown in FIGS. 4 and 5. FIG. 9 is a side view showing a state in which the display panel 3 is pivoted around the third rotation axis A3 from the states shown in FIGS. 4 and 5.

The display panel 3 is configured to pivot around the third rotation axis A3 and thereby vary a tilt angle of the display surface 31 with respect to the extending direction of the second hinge part 6. In the first embodiment, the display panel 3 is configured to be rotatable around the third rotation axis A3 by 90 degrees clockwise and by 180 degrees counterclockwise, i.e., by 270 degrees in total, from the state shown in FIG. 5. The display panel 3 may be configured to be rotatable by 360 degrees around the third rotation axis A3.

As shown in FIGS. 4 and 5, when the support member 2 is located at the storage position SP and the display panel 3 located at the opened position OP is pivoted around the third rotation axis A3, the display panel 3 passes through inside a connector connection region E1 facing the terminal part 13. Therefore, when the external connectors are connected to the terminal part 13, the movement of the display panel 3 is limited due to interference with the external connectors.

On the other hand, as shown in FIGS. 7 to 9, when the support member 2 is located at the tilt position TP and the display panel 3 located at the opened position OP is pivoted around the third rotation axis A3, the display panel 3 passes through outside the connector connection region E1. Therefore, even though the external connectors are connected to the terminal part 13, the movement of the display panel 3 is not limited.

Additionally, as shown in FIGS. 7 to 9, when the support member 2 is located at the tilt position TP and the display panel 3 located at the opened position OP is pivoted around the third rotation axis A3, the support member 2 is held to maintain the state of being located at the tilt position TP. In the first embodiment, the first hinge part 5 has a built-in holding mechanism (not shown) holding the support member 2 to maintain the state of the support member 2 located at the tilt position TP. The holding force of the holding mechanism is larger than a rotation force required to rotate the display panel 3 around the third rotation axis A3 and is set to, for example, twice or more as large as the rotation force. For example, if the rotation force is 150 newtons, the holding force is set to 300 newtons or more. A specific configuration of the holding mechanism can be implemented by using various known configurations and therefore will not be described in detail.

Figure 10:
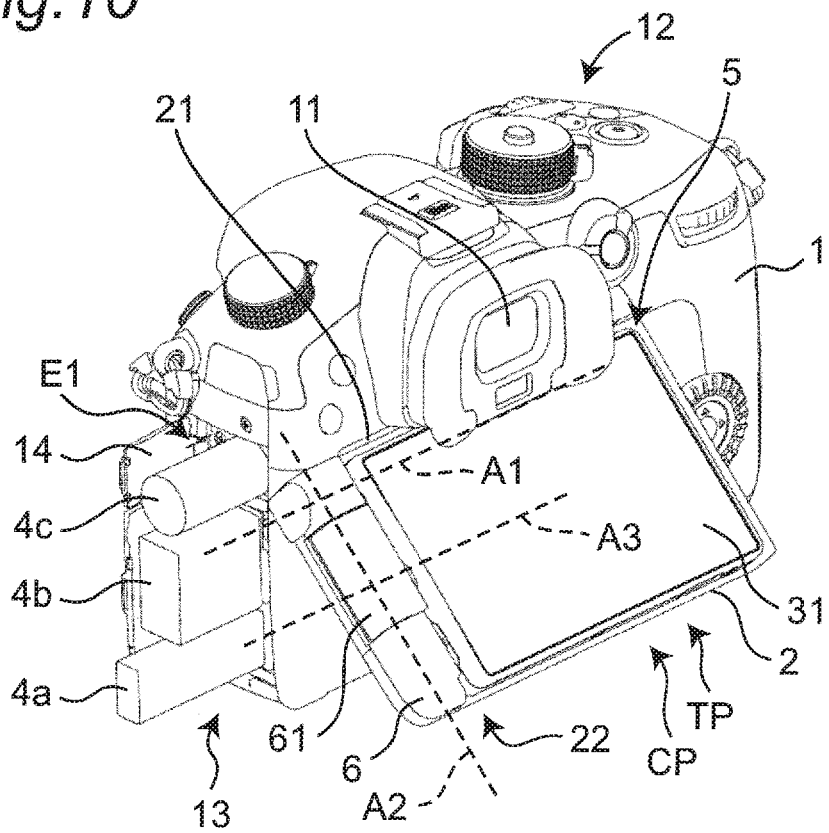
FIG. 10 is a perspective view showing a state of the imaging device of FIG. 3 with the support member located at the tilt position, the display panel located at the closed position, and the display surface exposed.

FIG. 10 is a perspective view showing a state in which the display panel 3 is further pivoted around the third rotation axis A3 and the display panel 3 is pivoted around the second rotation axis A2 and moved to the closed position CP from the state shown in FIGS. 7 to 9.

As shown in FIG. 10, in the first embodiment, the display surface 31 of the display panel 3 can visually be recognized while the support member 2 is located at the tilt position TP. By moving the support member 2 between the tilt position TP and the storage position SP from the state shown in FIG. 10, the tilt angle of the display surface 31 can be adjusted with respect to the back surface of the device main body 1.

According to the first embodiment, the support member 2 is configured to pivot around the first rotation axis A1 from the storage position SP to the tilt position TP. According to this configuration, the display panel 3 attached to the support member 2 can be prevented from being limited in movement due to interference with an external connector. Therefore, a degree of freedom of movement of the display panel 3 can be improved. Since the connector connection region E1 is disposed in the movable range of the display panel 3, an increase in size of the device can be suppressed.

According to the first embodiment, when the support member 2 is located at the tilt position TP and the display panel 3 located at the opened position OP is pivoted around the third rotation axis A3, the support member 2 is held to maintain the state of being located at the tilt position TP. According to this configuration, the support member 2 can be prevented from unintentionally moving from the tilt position TP to the storage position SP when the display panel 3 is pivoted around the third rotation axis A3, so that usability can be improved.

According to the first embodiment, the support member 2 is configured to pivot within a range of an angle less than 90 degrees around the first rotation axis A1. According to this configuration, the support member 2 and the display panel 3 can be prevented from coming into contact with components such as the finder 11 etc. As a result, the support member 2 and the display panel 3 can be arranged at positions closer to the components such as the finder 11, so that an increase in size of the device can be suppressed.

The support member 2 is configured to pivot around the first rotation axis A1 mainly for the purpose of prevention of interference between the display panel 3 and the external connectors rather than adjustment of the angle of the display surface 31. Therefore, the range of the angle of the support member 2 pivoting around the first rotation axis A1 may be less than 90 degrees. For example, the range of the angle of the support member 2 pivoting around the first rotation axis A1 may be 60 degrees or less, or 45 degrees or less.

If the range of the angle of the support member 2 pivoting around the first rotation axis A1 is too small, the display panel 3 must be reduced in the length in the direction of the rotation axis A2 forming a rotation stroke so as to prevent interference between the display panel 3 and the external connectors. Therefore, to ensure the rotation stroke of the display panel 3, the range of the angle of the support member 2 pivoting around the first rotation axis A1 is preferably 30 degrees or more, more preferably 45 degrees.

Although the support member 2 is formed into a substantially rectangular plate shape in the above description, the structure of the imaging device of the present disclosure is not limited thereto. For example, the support member 2 may be formed into a substantially L-shape made up of the upper side part 21 along the first hinge part 5 and the lateral side part 22 along the second hinge part. The support member 2 may not necessarily have a size equal to or substantially equal to that of the display panel 3 and may sufficiently be smaller than the display panel 3. Specifically, the supporting member 2 may be sized and shaped such that the upper side part 21 is attached to the device main body 1 via the first hinge part 5 pivotally around the first rotation axis A1 extending in the extending direction of the first hinge part 5.

Second Embodiment

An imaging device according to a second embodiment will be described. The imaging device according to the second embodiment is different from the imaging device according to the first embodiment in that the support member 2 gives a click feeling at least at one position when rotated around the first rotation axis A1 from the storage position SP to the tilt position TP.

Specifically, the imaging device according to the second embodiment further includes, at least at one holding position between the storage position SP and the tilt position TP, a holding mechanism 100 holding the support member 2 at the holding position. The support member 2 is configured to rotate around the first rotation axis A1 and thereby move from the storage position SP (see FIGS. 1 to 3) through at least one holding position to the tilt position TP (see FIG. 6).

The holding mechanism 100 is a mechanism configured to hold the support member 2 at the holding position with a holding force stronger than the rotation force rotating the support member 2 from the storage position SP to the holding position. The holding mechanism 100 is a mechanism configured to hold the support member 2 at the holding position with a holding force stronger than the rotation force rotating the support member 2 from the tilt position TP to the holding position. A configuration example of the holding mechanism 100 will hereinafter be described.

Figure 11:
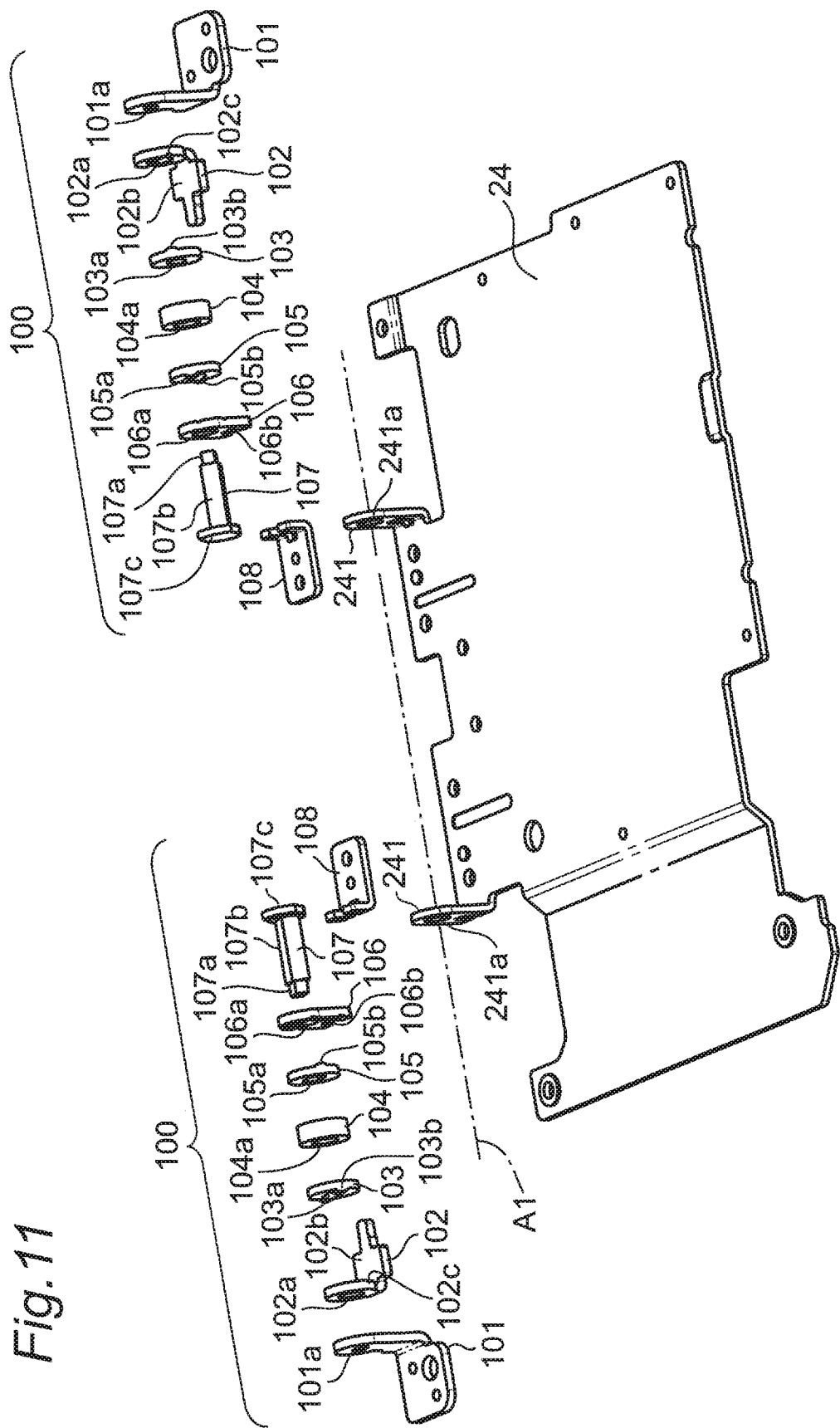
FIG. 11 is an exploded perspective view of a holding mechanism included in an imaging device according to a second embodiment.
Figure 12A:
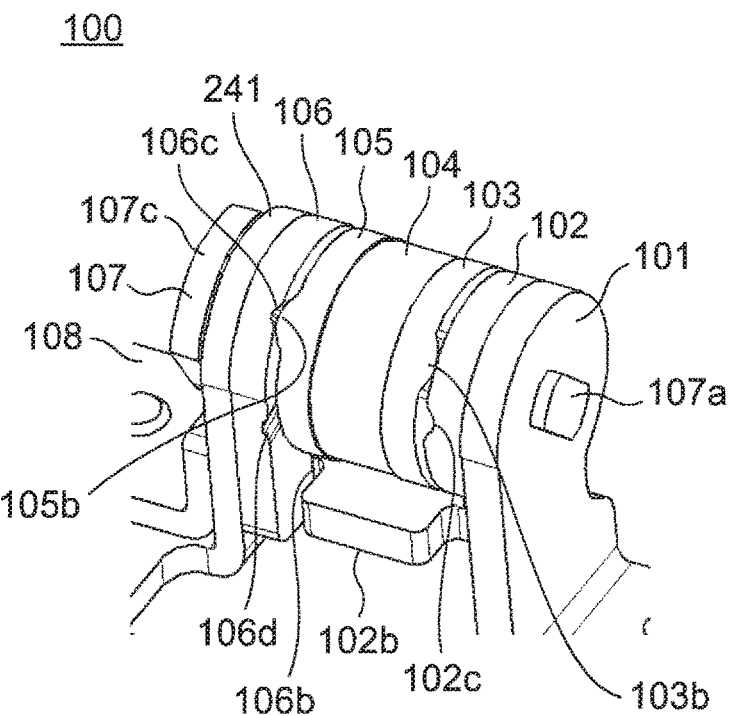
FIG. 12A is an assembled perspective view of the holding mechanism shown in FIG. 11, showing a state with the support member located at the storage position.
Figure 12B:
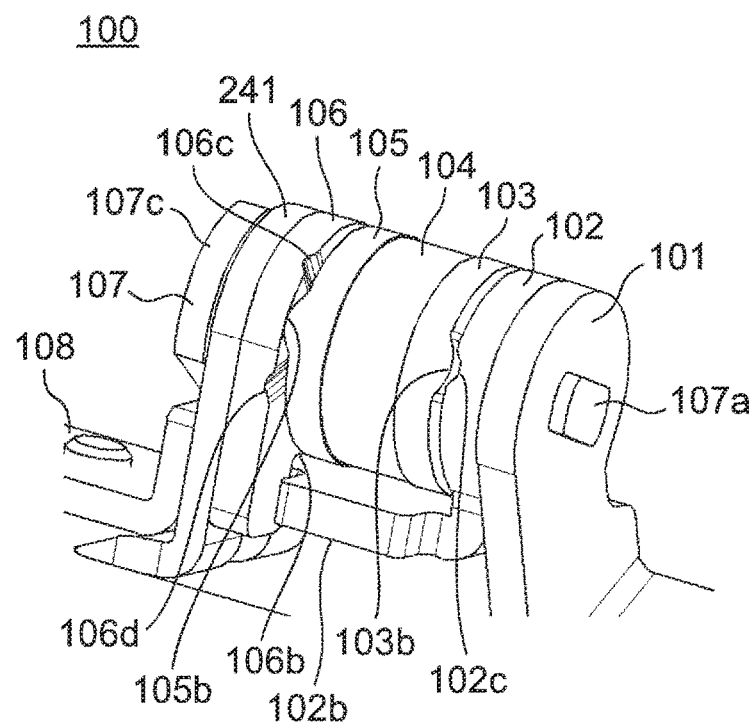
FIG. 12B is an assembled perspective view of the holding mechanism shown in FIG. 11, showing a state with the support member located at a holding position.
Figure 12C:
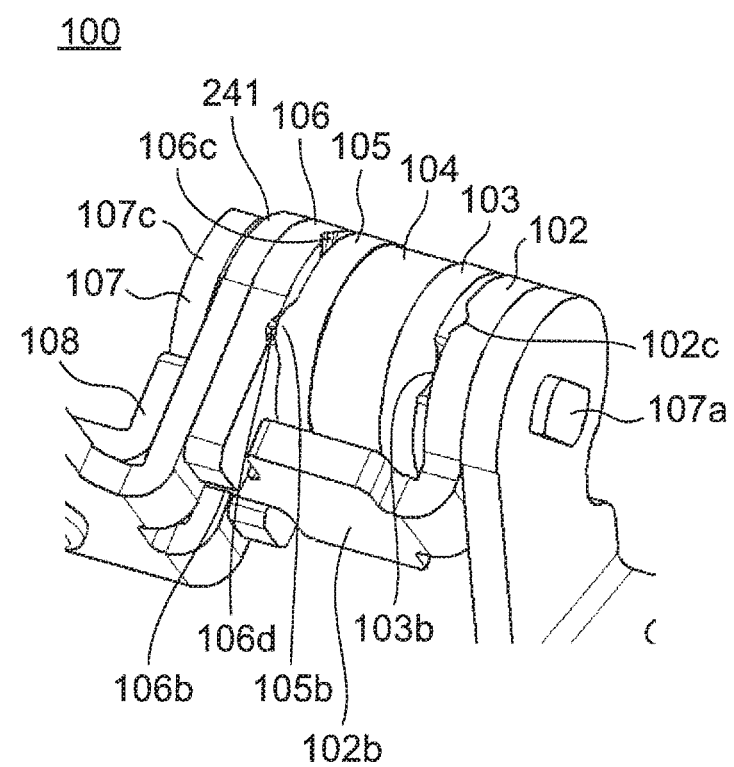
FIG. 12C is an assembled perspective view of the holding mechanism shown in FIG. 11, showing a state with the support member located at the tilt position.

FIG. 11 is an exploded perspective view of the holding mechanism 100. FIG. 12A is an assembled perspective view of the holding mechanism 100, showing a state with the support member 2 located at the storage position SP. FIG. 12B is an assembled perspective view of the holding mechanism 100, showing a state with the support member 2 located at the holding position. FIG. 12C is an assembled perspective view of the holding mechanism 100, showing a state with the support member 2 located at the tilt position TP.

It is assumed that when the support member 2 is located at the storage position SP (see FIGS. 1 to 3), the tilt angle of the support member 2 is zero degrees with respect to the back surface of the device main body 1. It is also assumed that when the support member 2 is located at the holding position, the tilt angle of the support member 2 is 30 degrees with respect to the back surface of the device main body 1. It is also assumed that when the support member 2 is located at the tilt position TP (see FIG. 6), the tilt angle of the support member 2 is 60 degrees with respect to the back surface of the device main body 1. Regarding the holding position, while the support member 2 is located at the holding position, the display panel 3 does not come into contact with the finder 11 when the display panel 3 is rotated from the closed position CP (see FIG. 3) toward the opened position OP (see FIG. 4) around the second rotation axis A2. On the other hand, regarding the tilt position TP, while the support member 2 is located at the tilt position TP, the display panel 3 comes into contact with the finder 11 when the display panel 3 is rotated from the closed position CP toward the opened position OP around the second rotation axis A2.

The support member 2 includes a substantially rectangular plate-shaped hinge plate 24 shown in FIG. 11. The hinge plate 24 has two projecting pieces 241 disposed in a standing manner and facing each other. Each of the projecting pieces 241 is provided with a through-hole 241a having a center on the first rotation axis A1. The holding mechanism 100 is attached to each of the projecting pieces 241. The holding mechanism 100 attached to one of the protrusion pieces 241 and the holding mechanism 100 attached to the other protrusion piece 241 are configured in a bilaterally symmetric manner. Therefore, only the configuration of the one holding mechanism 100 will be described, and the configuration of the other holding mechanism 100 will not be described.

The holding mechanism 100 includes a bracket 101, a first concave cam 102, a first convex cam 103, a spring 104, a second convex cam 105, a second concave cam 106, a shaft 107, and a stopper 108.

The bracket 101 is attached in a standing manner with respect to the device main body 1. The bracket 101 is provided with a through-hole 101a into which a tip part 107a of the shaft 107 is fitted. In the second embodiment, the tip part 107a of the shaft 107 has a shape (substantially rectangular column shape) acquired by D-cut of left and right side surfaces of a circular column.

The first concave cam 102, the first convex cam 103, the spring 104, the second convex cam 105, and the second concave cam 106 are respectively provided with through-holes 102a, 103a, 104a, 105a, and 106a through which a shaft part 107b of the shaft 107 penetrates. In the second embodiment, the shaft part 107b of the shaft 107 has a shape (substantially rectangular column shape) acquired by D-cut of left and right side surfaces of a circular column having a size larger than the tip part 107a.

The shaft 107 includes a flange part 107c at an end portion on the side opposite to the tip part 107a. The shaft 107 is attached such that the tip part 107a is inserted into the through-holes 241a, 106a, 105a, 104a, 103a, 102a in this order and fitted into the through-hole 101a. As a result, the first concave cam 102, the first convex cam 103, the spring 104, the second convex cam 105, and the second concave cam 106 are pivotally held between the bracket 101 and the projecting piece 241 with the shaft 107 defined as a central axis (the first rotation axis A1).

The first convex cam 103 and the second convex cam 105 are attached to pivot integrally with the bracket 101 and the shaft 107. The through-hole 103a of the first convex cam 103 and the through-hole 105a of the second convex cam 105 are formed into a substantially quadrangular shape so that the shaft part 107b of the substantially square pole shaft 107 engages therewith.

The stopper 108 is attached to the hinge plate 24. A portion of the stopper 108 is disposed at a position within a range of a pivoting locus of the flange part 107c so as to come into contact with a portion of the flange part 107c and restrict the rotation of the shaft 107.

The first concave cam 102 and the second concave cam 106 are attached to rotate integrally with the hinge plate 24. The first concave cam 102 is provided with an engagement claw 102b projecting toward the second concave cam 106. The second concave cam 106 is provided with an engagement groove 106b with which the engagement claw 102b engages. When a tip part of the engagement claw 102b of the first concave cam 102 engages with the engagement groove 106b, the first concave cam 102 and the second concave cam 106 can integrally pivot.

The first concave cam 102 is provided with a concave part 102c on a surface facing the first convex cam 103. The first convex cam 103 is provided with a convex part 103b engageable with the concave part 102c of the first concave cam 102.

The second concave cam 106 is provided with concave parts 106c, 106d on a surface facing the second convex cam 105. The second convex cam 105 is provided with a convex part 105b engageable with each of the concave parts 106c, 106d of the second concave cam 106.

The first concave cam 102 and the first convex cam 103 as well as the second concave cam 106 and the second convex cam 105 are urged and brought into close contact with each other by the spring 104.

When the support member 2 is located at the storage position SP (see FIGS. 1 to 3), as shown in FIG. 12A, the convex part 105b of the second convex cam 105 engages with the concave part 106c of the second concave cam 106, so that the support member 2 is held at the storage position SR. In this state, when the support member 2 is rotated around the first rotation axis A1 from the storage position SP toward the tilt position TP (see FIG. 6), the convex part 105b of the second convex cam 105 comes out of the concave part 106c. Subsequently, as shown in FIG. 12B, the convex part 103b of the first convex cam 103 engages with the concave part 102c of the first concave cam 102, so that the support member 2 is held at the holding position. In this state, the holding force holding the support member 2 is stronger than the rotation force rotating the support member 2 from the storage position SP to the holding position.

When the support member 2 is further rotated from the state shown in FIG. 12B around the first rotation axis A1 with a rotation force stronger than the holding force from the holding position toward the tilt position TP, the convex part 103b of the first convex cam 103 comes out of the concave part 106d. Subsequently, as shown in FIG. 12C, the convex part 105b of the second convex cam 105 engages with the concave part 106d of the second concave cam 106, so that the support member 2 is held at the tilt position TP. In this state, a portion of the stopper 108 comes into contact with a portion of the flange part 107c of the shaft 107, and the rotation of the shaft 107 is restricted.

According to the second embodiment, the imaging device includes the holding mechanism 100 holding the support member 2 at the holding position with a holding force stronger than the rotation force rotating the support member 2 from the storage position SP to the holding position. This configuration can give a click feeling at the holding position at the time of rotation from the storage position SP to the tilt position TP around the first rotation axis A1. Additionally, by rotating the display panel 3 from the closed position CP toward the opened position OP around the second rotation axis A2 with the support member 2 located at the holding position, the display panel 3 can be prevented from coming into contact with the finder 11.

According to the second embodiment, the imaging device is configured such that when the support member 2 is located at the holding position and the display panel 3 is pivoted from the closed position CP toward the opened position OP around the second rotation axis A2, the display panel 3 comes into contact with the finder 11. According to this configuration, the tilted angle of the support member 2 with respect to the back surface of the device main body 1 can be increased by further rotating the support member 2 from the holding position to the tilt position TP. As a result, the usability can be improved when an adjustable range of the angle of the display panel 3 is increased to give priority to the ease of viewing rather than preventing contact between the display panel 3 and the finder 11.

According to the second embodiment, the holding mechanism 100 is configured to include the convex part 103b and the concave part 102c such that the convex part 103b engages with the concave part 102c to hold the support member 2 at the holding position. Additionally, the holding mechanism 100 is configured such that the holding of the support member 2 at the holding position is released when the convex part 103b comes out of the concave part 102c. According to this configuration, the holding mechanism 100 can be implemented with a simpler configuration.

The holding force of the holding mechanism 100 may be larger than the rotation force required for rotating the display panel 3 around the third rotation axis A3. According to this configuration, when the display panel 3 is pivoted around the third rotation axis A3, the support member 2 can be prevented from unintentionally moving from the holding position to the storage position SP or the tilt position TP, and the usability can be improved.

The display panel 3 may be configured to pass through outside the connector connection region E1 when the support member 2 is located at the holding position and the display panel 3 located at the opened position OP is rotated around the third rotation axis A3, According to this configuration, even when the external connectors are connected to the terminal part 13, the movement of the display panel 3 can be prevented from being restricted.

In the second embodiment, the display panel 3 may not necessarily be configured to rotate around the third rotation axis A3.

In the second embodiment, the holding mechanism 100 includes two sets of concave and convex cams; however, the holding mechanism of the present disclosure is not limited thereto. For example, the holding mechanism 100 may include one set of concave and convex cams. In this case, for example, a plurality of concave parts for holding the support member 2 at the storage position SP, the holding position, and the tilt position TP may be disposed in one concave cam, and convex parts engageable with the concave parts may be disposed in on convex cam. According to this configuration, the number of components can be reduced.

The embodiments have been described as exemplifications of the techniques in this disclosure. The accompanying drawings and the detailed description have been provided for this purpose. Therefore, the constituent elements described in the accompanying drawings and the detailed description may include not only the constituent elements essential for solving the problem but also constituent elements not essential for solving the problem so as to exemplarily describing the techniques. Therefore, even though these non-essential constituent elements are included in the accompanying drawings and the detailed description, these non-essential constituent elements should not immediately be recognized as being essential.

Since the embodiments described above are intended to exemplarily describe the techniques of this disclosure, various modifications, replacements, additions, and omissions can be made within the claims and the scope equivalent thereto.

The imaging device according to the present disclosure can suppress an increase in size of the device and improve a degree of freedom of movement of the display panel, and therefore, the present disclosure is useful for an imaging device usable with an external connector connected to a terminal part.

The invention claimed is:

1. An imaging device comprising:
    a device main body including a terminal part to which an external connector is connected;
    a support member attached to the device main body via a first hinge part;
    a display panel attached to the support member via a second hinge part and including a display surface; wherein
    the support member is configured to pivot around a first rotation axis extending in an extending direction of the first hinge part and thereby move to a storage position and a tilt position, wherein
    the display panel is configured to pivot around a second rotation axis extending in an extending direction of the second hinge part and orthogonal to the first rotation axis and thereby move to a closed position and an opened position and to pivot around a third rotation axis orthogonal to the second rotation axis and thereby vary a tilt angle of the display surface with respect to the extending direction of the second hinge part, wherein
    when the support member is located at the storage position and the display panel located at the opened position is pivoted around the third rotation axis, the display panel passes through inside a connector connection region facing the terminal part, and wherein
    when the support member is located at the tilt position and the display panel located at the opened position is pivoted around the third rotation axis, the display panel passes through outside the connector connection region.

2. The imaging device according to claim 1, wherein when the support member is located at the tilt position and the display panel located at the opened position is pivoted around the third rotation axis, the support member is held to maintain the state of being located at the tilt position.

3. The imaging device according to claim 1, wherein the support member is configured to pivot within a range of an angle less than 90 degrees around the first rotation axis.

4. The imaging device according to claim 1, further comprising, at least at one holding position between the storage position and the tilt position, a holding mechanism holding the support member at the holding position with a holding force stronger than a rotation force rotating the support member from the storage position to the holding position.

5. The imaging device according to claim 4, wherein the holding force of the holding mechanism is larger than a rotation force required for rotating the display panel around the third rotation axis.

6. The imaging device according to claim 4, wherein
the device main body includes a finder, wherein
when the support member is located at the holding position and the display panel is rotated around the second rotation axis from the closed position toward the opened position, the display panel does not come into contact with the finder, and wherein
when the support member is located at the tilt position and the display panel is rotated around the second rotation axis from the closed position toward the opened position, the display panel comes into contact with the finder.

7. The imaging device according to claim 4, wherein the holding mechanism is configured to include a convex part and a concave part such that the convex part engages with the concave part to hold the support member at the holding position and that the holding of the support member at the holding position is released when the convex part comes out of the concave part.

8. The imaging device according to claim 4, wherein the display panel is configured to pass through outside the connector connection region when the support member is located at the holding position and the display panel located at the opened position is pivoted around the third rotation axis.

9. An imaging device comprising:
a device main body including a finder;
a support member attached to the device main body via a first hinge part;
a display panel attached to the support member via a second hinge part and including a display surface; wherein
the support member is configured to pivot around a first rotation axis extending in an extending direction of the first hinge part and thereby move from a storage position through at least one holding position to a tilt position, wherein
the display panel is configured to pivot around a second rotation axis extending in an extending direction of the second hinge part and orthogonal to the first rotation axis and thereby move to a closed position and an opened position, and wherein
the imaging device further includes a holding mechanism holding the support member at the holding position with a holding force stronger than a rotation force rotating the support member from the storage position to the holding position.

10. The imaging device according to claim 9, wherein
when the support member is located at the holding position and the display panel is rotated around the second rotation axis from the closed position toward the opened position, the display panel does not come into contact with the finder, and wherein
when the support member is located at the tilt position and the display panel is rotated around the second rotation axis from the closed position toward the opened position, the display panel comes into contact with the finder.

11. The imaging device according to claim 9, wherein the holding mechanism is configured to include a convex part and a concave part such that the convex part engages with the concave part to hold the support member at the holding position and that the holding of the support member at the holding position is released when the convex part comes out of the concave part.

* * * * *